United States Patent
Jakobsson et al.

(10) Patent No.: US 10,682,607 B2
(45) Date of Patent: Jun. 16, 2020

(54) PROCESS FOR THE COMBINED REMOVAL OF SILOXANES AND SULFUR-CONTAINING COMPOUNDS FROM BIOGAS STREAMS

(71) Applicant: Haldor Topsøe A/S, Kgs. Lyngby (DK)

(72) Inventors: Niklas Bengt Jakobsson, Kågeröd (SE); Janus Emil Münster-Swendsen, Espergærde (DK)

(73) Assignee: Haldor Topsoe A/S, Lyngby (DK)

( * ) Notice: Subject to any disclaimer, the term of this patent is extended or adjusted under 35 U.S.C. 154(b) by 22 days.

(21) Appl. No.: 16/306,608

(22) PCT Filed: Jun. 13, 2017

(86) PCT No.: PCT/EP2017/064406
§ 371 (c)(1),
(2) Date: Dec. 3, 2018

(87) PCT Pub. No.: WO2018/007109
PCT Pub. Date: Jan. 11, 2018

(65) Prior Publication Data
US 2019/0344218 A1    Nov. 14, 2019

(30) Foreign Application Priority Data

Jul. 8, 2016 (DK) .................. 2016 00405

(51) Int. Cl.
| | | |
|---|---|---|
| *B01D 53/81* | (2006.01) | |
| *B01D 53/50* | (2006.01) | |
| *B01D 53/72* | (2006.01) | |
| *B01D 53/75* | (2006.01) | |
| *B01D 53/86* | (2006.01) | |

(52) U.S. Cl.
CPC .......... *B01D 53/81* (2013.01); *B01D 53/508* (2013.01); *B01D 53/72* (2013.01); *B01D 53/75* (2013.01); *B01D 53/8612* (2013.01); *B01D 2251/11* (2013.01); *B01D 2251/304* (2013.01); *B01D 2251/404* (2013.01); *B01D 2251/604* (2013.01); *B01D 2251/606* (2013.01); *B01D 2255/1023* (2013.01); *B01D 2255/20707* (2013.01); *B01D 2255/20723* (2013.01); *B01D 2256/245* (2013.01); *B01D 2257/302* (2013.01); *B01D 2257/304* (2013.01); *B01D 2257/556* (2013.01); *B01D 2258/05* (2013.01)

(58) Field of Classification Search
None
See application file for complete search history.

(56) References Cited

U.S. PATENT DOCUMENTS

| | | |
|---|---|---|
| 2010/0096594 A1 | 4/2010 | Dahlin et al. |
| 2014/0170046 A1 | 6/2014 | Schmidt et al. |
| 2014/0171304 A1 | 6/2014 | Herrera et al. |
| 2015/0119623 A1 | 4/2015 | Huang |

FOREIGN PATENT DOCUMENTS

| | | |
|---|---|---|
| DE | 10 2009 009 376 A1 | 5/2010 |
| EP | 1997549 A1 | 12/2008 |
| JP | 2007-308600 A | 11/2007 |
| WO | WO 2016/041822 A1 | 3/2016 |

*Primary Examiner* — Anita Nassiri-Motlagh
(74) *Attorney, Agent, or Firm* — Blank Rome LLP

(57) ABSTRACT

A process for combined removal of siloxanes and sulfur-containing compounds from biogas streams, such as streams from landfills or anaerobic digesters, comprises heating the biogas stream and optionally mixing it with air, feeding the gas to a first filter unit with high temperature resistance, injecting a dry sorbent into the first filter unit to capture siloxanes present in the gas, recycling part of the exit gas from the first filter unit to the inlet thereof for the sulfur-containing compounds to be captured by the dry sorbent or optionally to a second filter unit inlet for the sulfur-containing compounds to be captured by a sulfur-specific sorbent and recovering clean gas from the first or optionally from the second filter unit.

8 Claims, No Drawings

PROCESS FOR THE COMBINED REMOVAL OF SILOXANES AND SULFUR-CONTAINING COMPOUNDS FROM BIOGAS STREAMS

The present invention relates to catalytic hot gas filtration for combined $H_2S$ and siloxane abatement in landfill gas and biogas applications. More specifically, the invention relates to a process for the combined removal of siloxanes and sulfur-containing compounds from biogas streams, in particular biogas streams from landfills and anaerobic digesters.

The major challenge for utilizing landfill gas is the need to remove sulfur-containing compounds and siloxanes from the gas. At present, the technology provides separate units to handle sulfur and siloxane removal, and this fact adds up to significant capital cost as well as operational cost. Another significant issue is that the current technology on offer in the market adds to the complexity of operation for these relatively small (5-20 MW) units.

Biogas is typically a waste product from sources including landfills and anaerobic digesters. In general, biogas contains approximately 50-75% methane, 25-50% carbon dioxide, 0-10% nitrogen, 0-1% hydrogen, 0.1-3% sulfur and 0-2% oxygen, all by volume. It also contains an assortment of impurities that can include siloxanes as well as chlorine, various volatile organic compounds (VOCs) and ammonia. Because biogas is typically generated from organic matter, it is generally considered a renewable form of energy.

Since biogas contains methane, it is convertible to a biogas fuel for power or heat generation. However, it needs to be cleaned first. One of the reasons that biogas should be cleaned prior to use is that sulfur impurities in biogas can create a corrosive environment inside power generating equipment or, even worse, poison any catalysts that may be present. Furthermore, hydrogen sulfide present in the feed gas to gas engines will cause degradation of the lubricating oil and lead to a need of frequent maintenance. A further reason to clean biogas is that other impurities, such as siloxanes, can be deposited within heat and power generation equipment and cause significant damage to the internal components.

Landfill gas is a gas originating from landfills as a result of various bacterial digestion processes in the landfill itself. The gas typically contains roughly 45-50% $CH_4$, 45-50% $CO_2$, up to 1% $H_2S$, some nitrogen and siloxanes along with low levels of organic sulfur components and VOCs.

Landfill gas has a high energy content and is typically used as a fuel for gas engines, although smaller gas turbines and boilers can also work using landfill gas. In some cases, the gas is upgraded and exported to the public gas grid or used as a fuel gas for other industrial processes. The dominating market today is in the US, and reciprocating gas engines are dominating the market for landfill gas utilization.

Siloxanes are organosilicon compounds comprising silicon, carbon, hydrogen and oxygen which have Si—O—Si bonds. Siloxanes can be linear as well as cyclic. They may be present in biogas because they are used in various beauty products, such as e.g. cosmetics and shampoos that are washed down drains or otherwise disposed of, so that they end up in municipal wastewater and landfills. Siloxanes are not broken down during anaerobic digestion, and as a result, waste gas captured from treatment plants and landfills is often heavily contaminated with these compounds. It is known that siloxanes can be removed by using non-regenerative packed bed adsorption with activated carbon or porous silica as sorbent. Regenerative sorbents can also be used, as well as units based on gas cooling to very low temperatures, to precipitate the siloxanes out from the gas. Further, liquid extraction technologies are used. In addition, these technologies can be used in combination.

So a major issue in the utilization of raw gas from landfills and anaerobic digesters is to provide a gas stream with a low sulfur content, i.e. less than a few hundred ppm, and with a very low content of siloxanes, typically linear or cyclic dimethyl Si—O—Si compounds. Combustion of sulfur containing compounds leads to formation of sulfur trioxide that will react with moisture in the gas to form sulfuric acid, which in turn can condense in cold spots and lead to corrosion. However, particularly siloxanes give rise to problems because they are converted to $SiO_2$ during combustion, leading to build-up of abrasive solid deposits inside the engine and causing damage, reduced service time and increased maintenance requirements for many components, such as spark plugs, valves, pistons etc. In addition to causing damage and reduced service time to the engine, also any catalysts installed to control exhaust gas emissions are sensitive to $SiO_2$ entrained in the gas stream, in fact even more so than the engine itself. For an SCR (selective catalytic reduction) catalyst, for example, the $SiO_2$ tolerance can be as low as 250 ppb.

For the reasons outlined above it is desirable to remove siloxanes and sulfur containing compounds from gas streams to increase the engine service time and the catalyst lifetime.

According to the present technology in the field, separate units are used to carry out the removal of siloxanes and the removal of sulfur containing compounds. Thus, in WO 2006/104801 A2 a siloxane removal process is described, where biogas released from landfills and sewage treatment plants is freed of siloxane contaminants by passing biogas at a temperature of 35-50° C. through a bed containing activated alumina, which adsorbs the siloxanes. When the activated alumina becomes saturated with siloxanes, the adsorption capability of the activated alumina is recovered by passing a regeneration gas through the bed of activated alumina. In a system with two or more beds of activated alumina, one bed is used to remove siloxanes, while one or more of the other beds are being regenerated.

WO 2008/024329 A1 discloses a system comprising an adsorbent bed for removing siloxanes from biogas down to a very low siloxane level, so that the cleaned biogas can be used as intake air for equipment, such as combustion engines or gas turbines. The sole specific example in the description indicates a reaction temperature in the adsorption towers of between −28.9° C. and 121° C. The adsorbent bed comprises at least two of activated carbon, silica gel and a molecular sieve.

US 2010/0063343 A1 describes the cleaning and recovery of a methane fuel from landfill gas, more particularly a process for concentrating and removing certain commonly occurring pollutants from landfill gas. The harmful constituents treated include water, particulates, sulfur (as hydrogen sulfide) and siloxanes.

US 2012/0301366 discloses a microwave-induced destruction of siloxanes and hydrogen sulfide in biogas, and finally US 2015/0209717 describes a process for the removal of siloxanes and related compounds from gas streams by adsorption.

There are two major challenges in the utilization of landfill gas:

(i) The fact that siloxanes in the gas precipitate on the engine parts causes scaling, wear and maintenance issues, and (ii) H$_2$S reacts and interferes with the lubrication oil in the gas engine, which causes frequent maintenance stops and oil replacements.

In addition, H$_2$S is combusted in the gas engine and emitted as SOx. Depending on local SOx emission regulations, the use of a flue gas scrubber may become necessary, which will add significantly to the capital cost of the treatment unit. Further, siloxanes may poison and foul the SCR (selective catalytic reduction) and CO oxidation catalyst downstream from the gas engine, making siloxane removal absolutely necessary when the engine is equipped with flue gas cleaning using an SCR catalyst for NOx removal and/or a CO oxidation catalyst.

Siloxanes can be removed using non-regenerative packed-bed adsorption with a sorbent such as e.g. activated carbon or porous silica. Regenerative sorbents are also used as well as units, which are based on gas cooling to very low temperatures, to precipitate the siloxanes from the gas. In addition, liquid extraction technologies are used. These various technologies can moreover be used in combination.

As regards the removal of H$_2$S, there are several alternatives in existence, for example solid sorbents based on activated carbon, supported iron-based sorbents, Lo-Cat type technology, regenerative sorbents and biological based sulfur removal technology, such as ThioPac.

The major issue for these technologies to remove sulfur and siloxanes is that they add up to significant capital cost as well as operational cost. Another significant issue is that it adds to the operation complexity for these relatively small units (5-20 MW).

The present invention represents the combined knowledge of the Applicant within SMC H$_2$S oxidation technology and catalytic filtration.

More specifically, the present invention relates to a process for the combined removal of siloxanes and sulfur-containing compounds from biogas streams, in particular biogas streams from landfills and anaerobic digesters, said process comprising the steps of:

heating the biogas stream and if necessary, to provide a sufficient oxygen level, mixing it with air, feeding the gas mixture to a filter unit provided with catalytic filter candles or filter bags with high temperature resistance, injecting a dry sorbent into the filter unit to capture siloxanes present in the gas mixture, recycling part of the exit gas from the filter unit to the filter house inlet for the sulfur-containing compounds to be captured by the dry sorbent and recovering the clean gas from the filter unit.

The gas from the landfill is heated and mixed with air, so that there is at least 0.1% residual air when the oxygen is consumed in the reaction

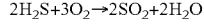

The mixed gas is heated to at least 180° C. before entering a filter house unit with catalytic filter candles or filter bags with high temperature resistance. The catalytic filters are impregnated with a TiO$_2$-based catalyst supported by vanadia or a combination of vanadia and palladium. In the filter, H$_2$S is converted to SO$_2$ and low levels of SO$_3$.

The purpose of recirculating part of the exit gas from the first filter unit to the inlet thereof is to minimize the investment costs of the process by utilizing the first filter for removal of both siloxanes and SO$_2$/SO$_3$.

The gas stream to be treated is mixed with the recirculation gas, which contains SO$_2$/SO$_3$. This creates a larger gas flow than the original gas stream. Dry sorbent(s) is/are injected into this mixed gas to absorb siloxanes from the original gas and SO$_2$/SO$_3$ from the recirculated gas. The gas then passes the filters, thereby removing the dry sorbent(s) from the gas. The catalyst located inside the filter is not exposed to the siloxanes, which otherwise may cause poisoning of the catalyst. The catalyst oxidizes the H$_2$S, present in the original gas stream, to SO$_2$ and low levels of SO$_3$. The gas exits the filter unit.

A part of the gas exiting the filter unit is recirculated and mixed into the original gas stream. The purpose of this recirculation is to remove some of the SO$_2$/SO$_3$ that was formed over the catalyst by oxidizing the H$_2$S, thereby reducing the total sulfur content of the gas leaving the system. The amount of recirculated gas depends on the desired level of sulfur content in the gas leaving the system.

The filter house unit is equipped with means for injection of a dry sorbent, where sorbents like limestone, Ca(OH)$_2$, Trona (trisodium hydrogen dicarbonate dehydrate, also called sodium sesquicarbonate dihydrate, Na$_2$CO$_3$•NaHCO$_3$•2H$_2$O) and others can be used. These sorbents will catch the siloxanes, but specific sorbents targeted to catch siloxanes can be added to the dry sorbent injection step.

The exit gas from the filter unit is recycled back to the filter house inlet duct and led to the filter house, where SO$_2$ and SO$_3$ are captured by the dry sorbent. This way, the catalyst is protected from siloxanes since it is situated inside the filter, and one unit can handle both siloxane and sulfur removal.

Another valid alternative is to divide the filter house unit into two compartments, where siloxane removal is accomplished in the first compartment with catalytic filters and sulfur removal is accomplished in the second compartment with non-catalytic filters. In this case, the siloxane specific sorbent can be injected into the first unit, while sulfur-specific sorbents can be injected into the second unit.

The clean gas from the filter house unit(s) is used to preheat the feed gas using a feed/effluent heat exchanger.

The invention claimed is:

1. A process for the combined removal of siloxanes and sulfur-containing compounds from biogas streams, said process comprising the steps of:

heating the biogas stream and, if necessary to obtain an oxygen level of at least 0.1%, mixing it with air, feeding the gas mixture to a first filter unit provided with catalytic filter candles or filter bags with high temperature resistance, injecting a dry sorbent into said first filter unit to capture siloxanes present in the gas mixture, recycling part of the exit gas from the first filter unit to the inlet thereof for the sulfur-containing compounds to be captured by the dry sorbent or optionally feeding the exit gas from the first filter unit to a second filter unit inlet for the sulfur-containing compounds to be captured by a sulfur-specific sorbent and recovering the clean gas from the first or optionally from the second filter unit.

2. Process according to claim 1, wherein the mixed gas is heated to at least 180° C. before entering the first filter unit.

3. Process according to claim 1, wherein the catalytic filter candles or filter bags in the first filter unit are impregnated with a TiO$_2$-based catalyst supported by vanadia or a combination of vanadia and palladium.

4. Process according to claim 1, wherein only the first filter unit is used, while the second filter unit is omitted.

5. Process according to claim 4, wherein the catalyst is situated inside the filter candles or filter bags, so that it is protected from the siloxanes present in the gas mixture.

6. Process according to claim 1, wherein both the first filter unit and the second filter unit are used, the siloxane removal being accomplished in the first filter unit with catalytic filters and sulfur removal being accomplished in the second filter unit with non-catalytic filters.

7. Process according to claim 6, wherein the first filter unit and the second filter unit are combined into one filter unit divided into two compartments, so that the siloxane removal is accomplished in the first compartment with catalytic filters and the sulfur removal is accomplished in the second compartment with non-catalytic filters.

8. Process according to claim 7, wherein the siloxane specific sorbent is injected into the first compartment, while sulfur-specific sorbents are injected into the second compartment.

* * * * *